US012723711B2

(12) United States Patent
Miura

(10) Patent No.: US 12,723,711 B2
(45) Date of Patent: Sep. 1, 2026

(54) BRAKE MOTOR

(71) Applicant: SANYO DENKI CO., LTD., Tokyo (JP)

(72) Inventor: Takeshi Miura, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 201 days.

(21) Appl. No.: 18/792,085

(22) Filed: Aug. 1, 2024

(65) Prior Publication Data

US 2025/0092992 A1 Mar. 20, 2025

(30) Foreign Application Priority Data

Sep. 15, 2023 (JP) ................................ 2023-150101

(51) Int. Cl.

*F16N 31/00* (2006.01)
*F16D 65/18* (2006.01)
*F16D 121/24* (2012.01)
*H02K 7/08* (2006.01)

(52) U.S. Cl.

CPC ............. *F16N 31/00* (2013.01); *F16D 65/18* (2013.01); *F16D 2121/24* (2013.01); *H02K 7/08* (2013.01)

(58) Field of Classification Search

CPC ...... F16D 2121/24; F16D 65/18; F16N 31/00; H02K 7/08
USPC ........................................................... 310/66
See application file for complete search history.

(56) References Cited

U.S. PATENT DOCUMENTS 1,444,751 A * 2/1923 Mueller ............... H02K 5/1732 310/90
3,728,563 A * 4/1973 Stone .................. H02K 5/1672 310/90
3,997,805 A * 12/1976 Dochterman ............ F16J 15/36 310/90
4,308,478 A * 12/1981 Mertz .................. F16C 33/103 310/90
4,355,250 A * 10/1982 Langdon .............. H02K 5/1672 310/90
4,576,489 A * 3/1986 Bentele ................ H02K 5/1732 384/469
5,834,870 A * 11/1998 Tokushima ............. H02K 7/09 310/90

(Continued)

FOREIGN PATENT DOCUMENTS

JP 2020171127 A 10/2020

*Primary Examiner* — Alex W Mok

(74) *Attorney, Agent, or Firm* — RANKIN, HILL & CLARK LLP

(57) ABSTRACT

A brake motor including: a brake disc including a friction part; a rotating member configured to support the brake disc; a bearing; a yoke configured to support the rotating member via the bearing in such a manner as to be rotatable about a rotation axis; an oil adsorbent; and an oil scraper ring provided between the oil adsorbent and the bearing in a direction of the rotation axis, in which the bearing includes an inner ring and an outer ring, the oil scraper ring extends from an inner ring side in such a manner as to cover a gap between the inner ring and the outer ring, the yoke includes an inner peripheral surface provided with an oil guide surface facing the oil scraper ring, and the oil adsorbent is provided in an oil chamber space formed by the oil guide surface, the oil scraper ring, and the rotating member.

8 Claims, 4 Drawing Sheets

(56) References Cited

U.S. PATENT DOCUMENTS

| | | | | |
|---|---|---|---|---|
| 5,959,381 | A * | 9/1999 | Fischer | H02K 7/083 310/90 |
| 6,398,415 | B1 * | 6/2002 | Ibe | H02K 5/1672 384/214 |
| 7,040,453 | B2 * | 5/2006 | Borcherding | F16C 33/72 184/7.1 |
| 7,109,621 | B2 * | 9/2006 | Lesak | H02K 5/1672 310/90 |
| 7,980,361 | B2 * | 7/2011 | Omoto | F16H 57/0427 184/6.12 |
| 9,279,233 | B2 * | 3/2016 | Okada | E02F 9/126 |
| 9,641,042 | B2 * | 5/2017 | Jang | H02K 5/161 |
| 10,655,725 | B2 * | 5/2020 | Kodama | F16H 57/043 |
| 10,753,406 | B2 * | 8/2020 | Kasahara | F16D 25/0638 |
| 10,816,052 | B2 * | 10/2020 | Eguchi | F16J 15/32 |
| 11,525,491 | B2 * | 12/2022 | Isono | B60T 13/748 |
| 2008/0035428 | A1 * | 2/2008 | Omoto | F16H 57/0427 184/6 |
| 2011/0221292 | A1 * | 9/2011 | Kuwahara | F16D 25/082 310/78 |
| 2012/0261220 | A1 * | 10/2012 | Sakashita | F16D 65/18 188/72.6 |
| 2017/0102034 | A1 * | 4/2017 | Manabe | F16C 33/6681 |
| 2019/0170200 | A1 * | 6/2019 | Isono | F16D 55/18 |
| 2023/0036610 | A1 * | 2/2023 | Yamaguchi | H02K 7/1023 |

* cited by examiner 1
3
32,30
33
11b
11c
11a
11
L
50
51
A
60
61
10
31

BRAKE MOTOR

CROSS-REFERENCE TO RELATED APPLICATION

This application is based on Japanese Patent Application No. 2023-150101 filed with the Japan Patent Office on Sep. 15, 2023, the entire content of which is hereby incorporated by reference.

BACKGROUND

1. Technical Field

The present disclosure relates to a brake motor.

2. Related Art

JP-A-2020-171127 discloses a brake motor including a structure that, when oil leaks from a bearing, drains the leaked oil out.

An object of the present disclosure is to provide a brake motor that can hinder oil of a bearing from adhering to a friction member inside a brake.

SUMMARY

A brake motor including: a brake disc including a friction part; a rotating member configured to support the brake disc; a bearing; a yoke configured to support the rotating member via the bearing in such a manner as to be rotatable about a rotation axis; an oil adsorbent; and an oil scraper ring provided between the oil adsorbent and the bearing in a direction of the rotation axis, in which the bearing includes an inner ring and an outer ring, the oil scraper ring extends from an inner ring side in such a manner as to cover a gap between the inner ring and the outer ring, the yoke includes an inner peripheral surface provided with an oil guide surface facing the oil scraper ring, and the oil adsorbent is provided in an oil chamber space formed by the oil guide surface, the oil scraper ring, and the rotating member.

DETAILED DESCRIPTION

Figure 1:
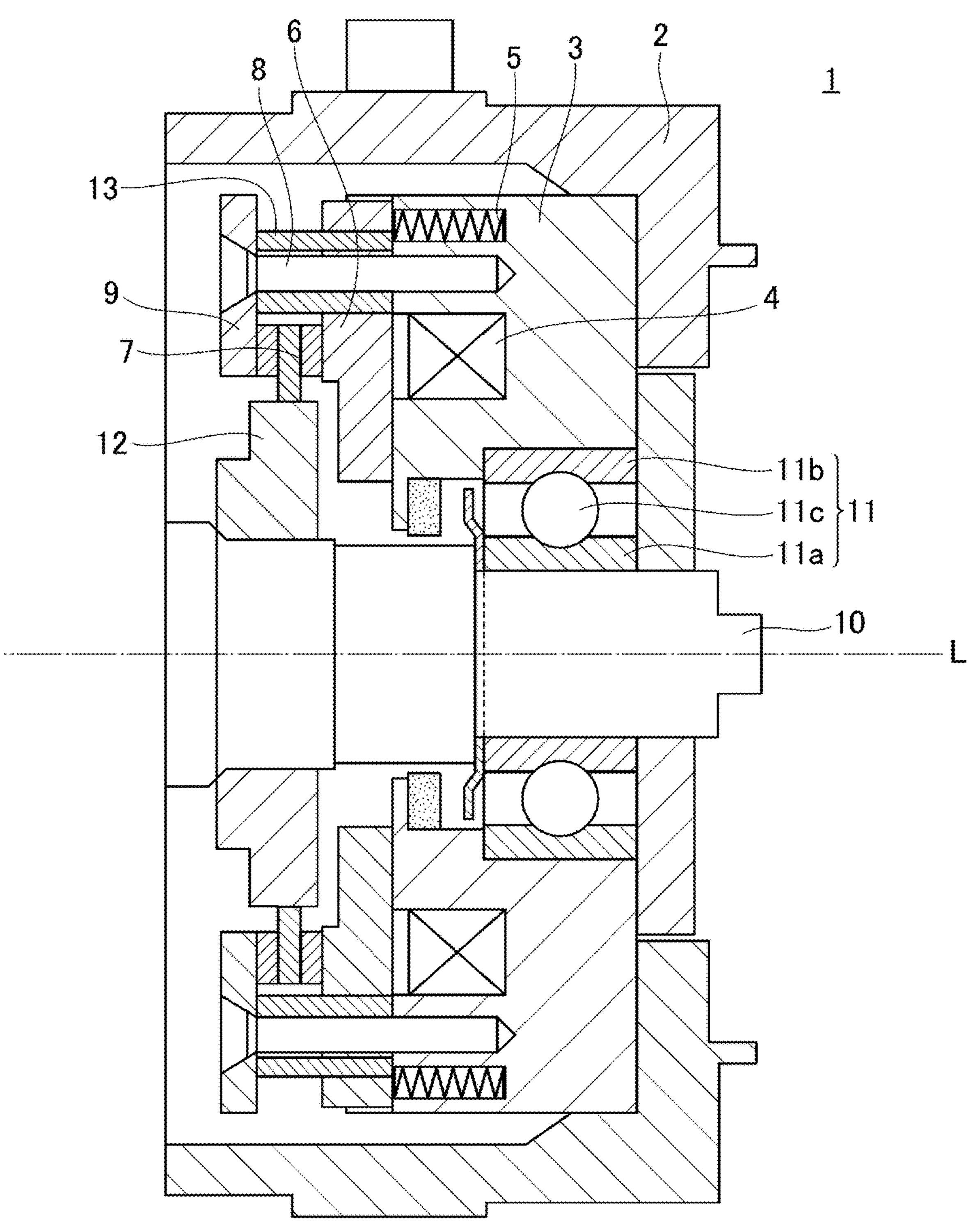
FIG. 1 is a cross-sectional view illustrating an example of a brake motor according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A brake motor according to one aspect of the present disclosure includes a brake disc including a friction part; a rotating member configured to support the brake disc; a bearing; a yoke configured to support the rotating member via the bearing in such a manner as to be rotatable about a rotation axis; an oil adsorbent; and an oil scraper ring provided between the oil adsorbent and the bearing in a direction of the rotation axis, in which the bearing includes an inner ring and an outer ring, the oil scraper ring extends from an inner ring side in such a manner as to cover a gap between the inner ring and the outer ring, the yoke includes an inner peripheral surface provided with an oil guide surface facing the oil scraper ring, and the oil adsorbent is provided in an oil chamber space formed by the oil guide surface, the oil scraper ring, and the rotating member.

According to the above brake motor, it is possible to provide a brake motor that can hinder oil of the bearing from adhering to a friction member inside a brake.

DETAILS OF EMBODIMENTS OF THE PRESENT DISCLOSURE

Specific examples of a brake motor according to embodiments of the present disclosure are described hereinafter with reference to the drawings. Note that the technology of the present disclosure is not limited to these exemplifications. It is intended that the technology of the present disclosure should include a technology demonstrated in the claims, and all modifications made within the claims, and within equivalent meanings and the scope of the equivalents.

FIG. 1 is a cross-sectional view illustrating an example of a brake motor according to an embodiment of the present disclosure. As illustrated in FIG. 1, a brake motor 1 according to the embodiment of the present disclosure includes a bracket 2, a rotating member 10, and a bearing 11. A yoke 3, an inner plate 6, an outer plate 9, a brake disc 7, a pin 8, a hub 12, and a spacer 13 are provided in the bracket 2.

The rotating member 10 is rotated by an unillustrated motor about a rotation axis L. The rotating member 10 is connected to an output shaft of the motor. The rotating member 10 can rotate relative to the yoke 3. The bearing 11 is placed between the yoke 3 and the rotating member 10. The yoke 3 supports the rotating member 10 via the bearing 11 in such a manner that the rotating member 10 can rotate about the rotation axis L. In other words, the bearing 11 causes the yoke 3 to rotatably support the rotating member 10. The bearing 11 includes an inner ring **11*a*, an outer ring 11*b*, and a rolling element 11*c*. The rolling element 11*c* is provided between the inner ring 11*a* and the outer ring 11*b*. Lubricating oil being oil and fat, such as grease, is applied between the inner ring 11*a* and the rolling element 11*c* and between the outer ring 11*b* and the rolling element 11*c*** to reduce the coefficient of friction between the members.

The yoke 3 houses a coil 4 for energization, and a coil spring 5. The inner plate 6 includes a through-hole through which the pin 8 penetrates. It is configured in such a manner that the pin 8 makes the inner plate 6 movable in a direction of the rotation axis L and unrotatable about the rotation axis L.

The brake disc 7 is not fixed to the rotating member 10, and can rotate about the rotating axis L in contact with the hub 12 fixed to the rotating member 10. The brake disc 7 is provided between the outer plate 9 and the inner plate 6 in the direction of the rotation axis L. The brake disc 7 is provided in an outer peripheral portion thereof with a friction part (a brake shoe) with a high coefficient of friction.

In the brake motor 1 according to the embodiment of the present disclosure, the inner plate 6 is configured in such a manner as to be movable in the direction of the rotation axis L due to excitation force of the coil 4 and spring force of the coil spring 5. Therefore, upon non-energization of the coil 4, the inner plate 6 comes into contact with the brake disc 7 due to the spring force of the coil spring 5. Braking force generated due to the contact is transferred to the rotating member 10 via the brake disc 7 and the hub 12 to generate braking torque. On the other hand, upon energization of the coil 4, the inner plate 6 is separated from the brake disc 7 due to the excitation force of the coil 4 and attracted to the yoke 3. In this manner, when the excitation force of the coil 4 attracts the inner plate 6 to the yoke 3, the positional relationship between the inner plate 6 and the yoke 3 is determined by the spacer 13. Such a configuration allows the rotating member 10 to rotate freely in the brake motor 1 without the braking force acting on the rotating member 10 during the energization of the coil 4.

Figure 2:
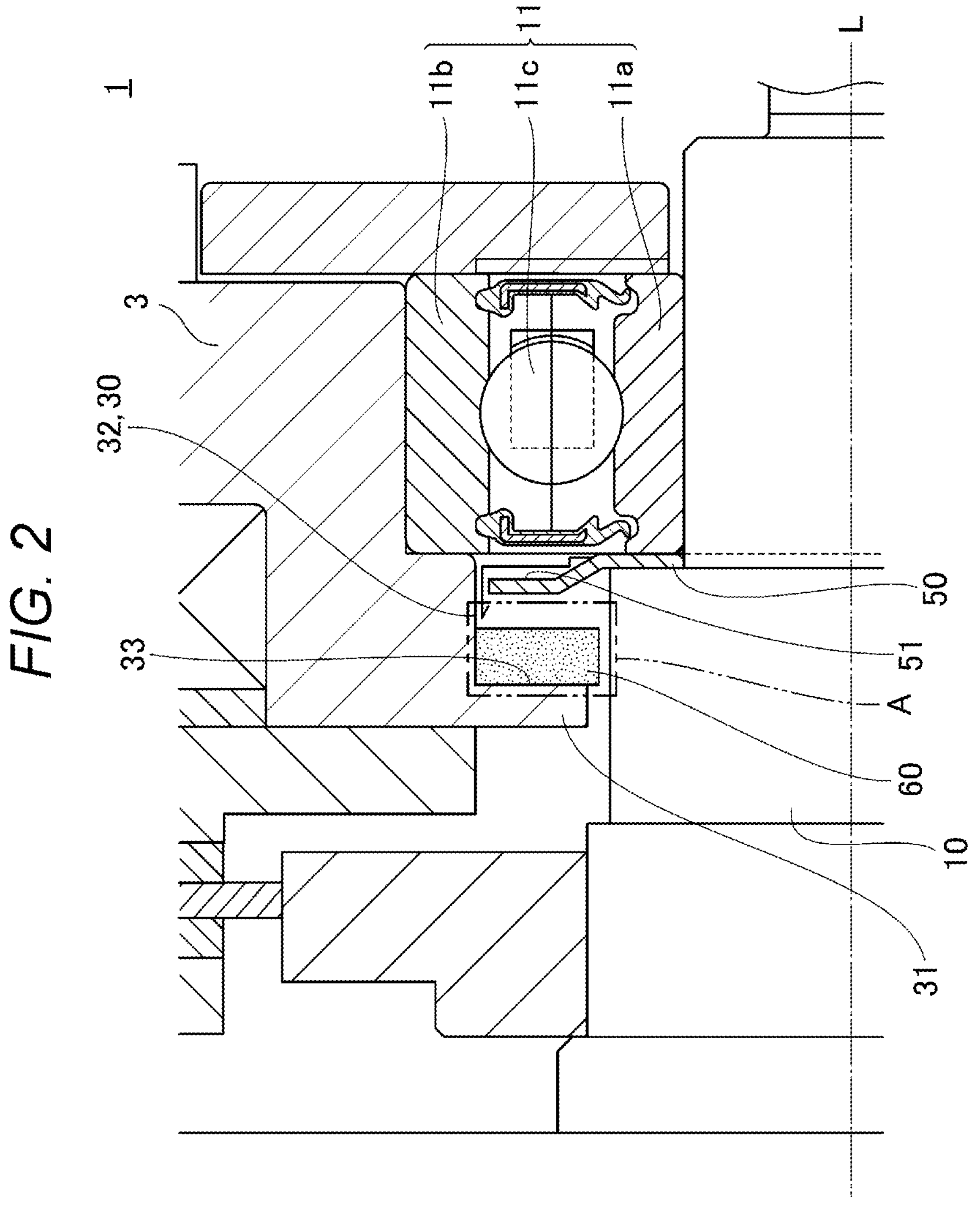
FIG. 2 is an enlarged cross-sectional view of the brake motor according to the embodiment of the present disclosure.

FIG. 2 is an enlarged cross-sectional view of the brake motor 1 according to the embodiment of the present disclosure. As illustrated in FIG. 2, the brake motor 1 according to the present disclosure further includes an oil scraper ring 50, and an oil adsorbent 60 that can adsorb the lubricating oil.

As illustrated in FIG. 2, the yoke 3 includes an inner peripheral surface 30 facing the rotating member 10. The inner peripheral surface 30 includes an oil guide surface 32. The oil guide surface 32, the oil scraper ring 50, and the rotating member 10 form an oil chamber space A. The oil adsorbent 60 is provided in the oil chamber space A.

More specifically, an end portion of the oil guide surface 32 that is on an opposite side to the bearing 11 in the direction of the rotation axis L is provided with a support portion 31. The support portion 31 is a protruding part that juts radially inward from the yoke 3. The support portion 31 includes a support surface 33 facing the oil scraper ring 50 in the direction of the rotation axis L. The oil adsorbent 60 is mounted on the support surface 33. In the illustrated example, the support surface 33 is provided on an opposite side to the bearing 11 in the direction of the rotation axis L in the oil chamber space A. The oil adsorbent 60 is mounted on the support surface 33, and therefore, the oil adsorbent 60 is placed in the oil chamber space A.

The oil scraper ring 50 is provided between the rotating member 10 and the bearing 11, and is a disc-shaped member extending in a radial direction of the rotating member 10. The oil scraper ring 50 is provided in such a manner as to cover a gap between the inner ring 11*a* and the outer ring 11*b* of the bearing 11. The oil scraper ring 50 is sandwiched between the inner ring 11*a* and the rotating member 10, and therefore, can rotate together with the rotating member 10.

The oil scraper ring 50 includes an edge portion 51. The edge portion 51 can guide the lubricating oil leaking from the bearing 11 to the oil guide surface 32 of the yoke 3. The edge portion 51 extends radially toward the oil guide surface 32 of the yoke 3. The edge portion 51 extends toward the oil guide surface 32 of the yoke 3 up to a position where the guided lubricating oil can adhere to the oil guide surface 32 of the yoke 3. Moreover, in the embodiment, a part of the edge portion 51 inclines in the direction of the rotation axis L to facilitate guiding the lubricating oil, as illustrated in FIG. 2.

Next, an aspect in which leakage of the lubricating oil is hindered in the brake motor 1 according to the embodiment is described in detail. The lubricating oil applied inside the bearing 11 is pressed by centrifugal force against the outer ring 11*b*. When the outer ring 11*b* can no longer hold the lubricating oil, the lubricating oil leaks mainly from between the inner ring 11*a* and the outer ring 11*b* of the bearing 11 as indicated by an arrow in FIG. 2. The edge portion 51 of the oil scraper ring 50 receives the lubricating oil leaking from the bearing 11. The oil scraper ring 50 rotates together with the rotating member 10. Hence, the lubricating oil that has been received by the edge portion 51 is caused by centrifugal force to flow toward a radial end portion of the edge portion 51. The radial end portion of the oil scraper ring 50 extends radially outward up to near the oil guide surface 32 in such a manner as to guide the lubricating oil to the oil guide surface 32. Hence, the lubricating oil that has been flown to the edge portion 51 by the centrifugal force adheres to the oil guide surface 32. In this manner, the lubricating oil that has leaked from the bearing 11 is guided by the oil scraper ring 50 to the oil guide surface 32.

When the lubricating oil has been guided to the oil guide surface 32, the lubricating oil adhered to the oil guide surface 32 flows gradually toward the oil adsorbent 60 along the direction of the rotation axis L. The oil adsorbent 60 adsorbs the lubricating oil that has been guided from the bearing 11 by the oil scraper ring 50 and the oil guide surface 32 in the above-mentioned aspect. In this manner, the lubricating oil is guided into the oil chamber space A by the oil scraper ring 50 and the oil guide surface 32. In the oil chamber space A, the lubricating oil that has reached along the oil guide surface 32 is adsorbed by the oil adsorbent 60 mounted on the support surface 33, which continues from the oil guide surface 32, of the support portion 31. In this manner, in the brake motor 1, the lubricating oil can be efficiently adsorbed by the oil adsorbent 60. Hence, it is possible to prevent the lubricating oil that leaks from the bearing 11 from flowing out to the brake disc 7 via the rotating member 10.

In the brake motor 1 according to the embodiment of the present disclosure, the oil scraper ring 50 extends from the inner ring 11*a* side in such a manner as to cover the gap between the inner ring 11*a* and the outer ring 11*b*. The inner peripheral surface 30 of the yoke 3 is provided with the oil guide surface 32 facing the oil scraper ring 50. The oil adsorbent 60 is provided in the oil chamber space A formed by the oil guide surface 32, the oil scraper ring 50, and the rotating member 10.

Such a configuration allows the oil scraper ring 50 close to the bearing 11 to hinder the lubricating oil from leaking from the bearing 11 toward the brake disc 7.

In this manner, according to the brake motor 1 according to the embodiment of the present disclosure, it is possible to provide a brake motor that can hinder the lubricating oil from adhering to the brake disc 7.

Moreover, in the brake motor 1 according to the present disclosure, the oil adsorbent 60 is placed at a position away from the rotating member 10. Consequently, it is possible to reduce the wearing away of the oil adsorbent 60 due to the rotation of the rotating member 10. The above configuration allows extending the life of the oil adsorbent 60 and hindering generation of wear particles due to the wearing away of the oil adsorbent 60.

Moreover, in the brake motor 1 according to the present disclosure, the oil adsorbent 60 is configured, including felt or sponge. Consequently, it is possible to produce the oil adsorbent 60 in an inexpensive manner such as punching. Hence, it is possible to reduce the cost of the brake motor 1.

Moreover, in the brake motor 1 according to the present disclosure, the yoke 3 includes the support portion 31 that extends radially inward from the oil guide surface 32, and the oil adsorbent 60 is provided on the support portion 31.

The oil adsorbent 60 is an approximately ring-shaped member. The support portion 31 supports the axial end surface of the ring-shaped oil adsorbent 60, which facilitates the support of the oil adsorbent 60.

Figure 3:
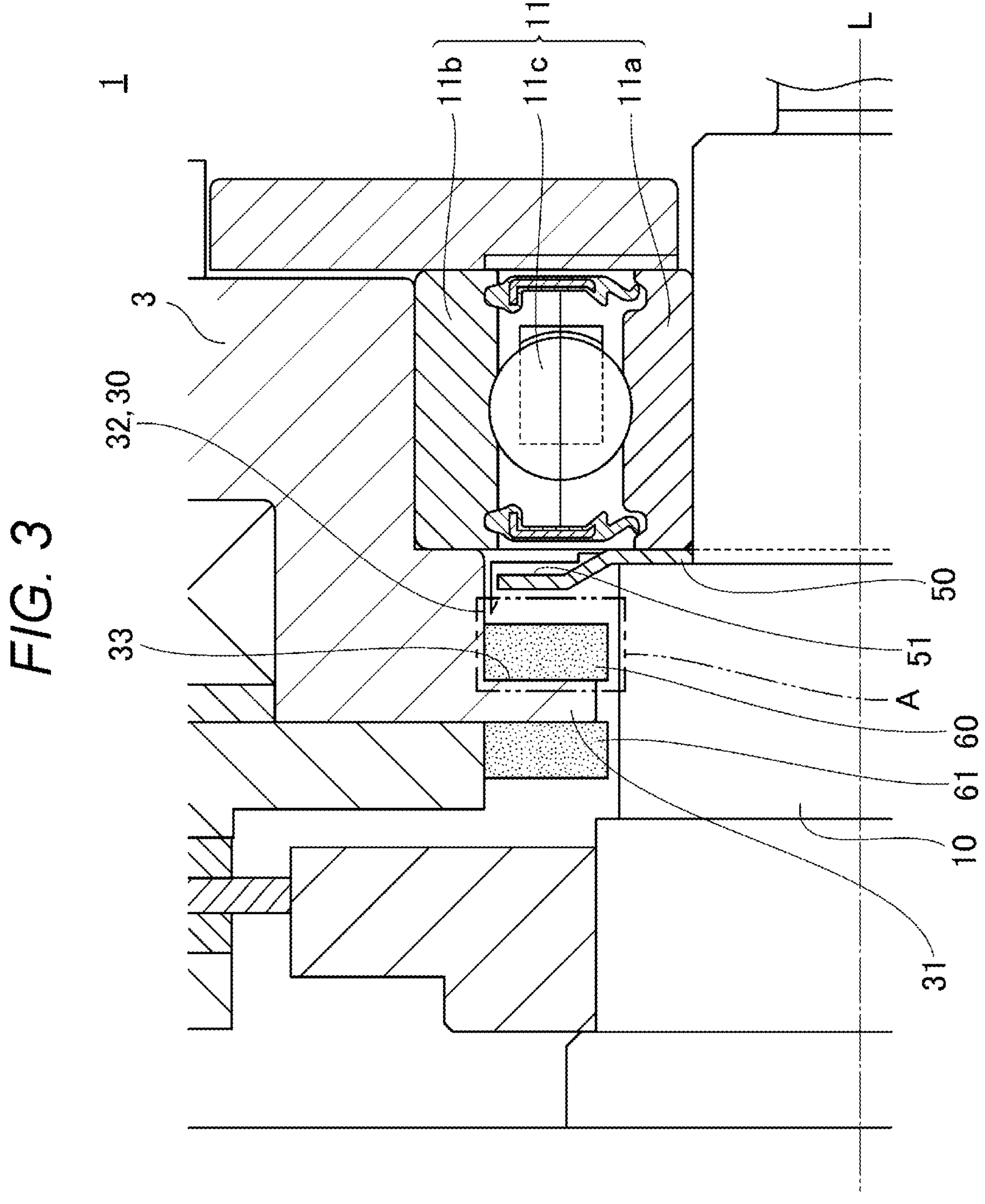
FIG. 3 is an enlarged cross-sectional view of a brake motor according to another embodiment of the present disclosure.
Figure 4:
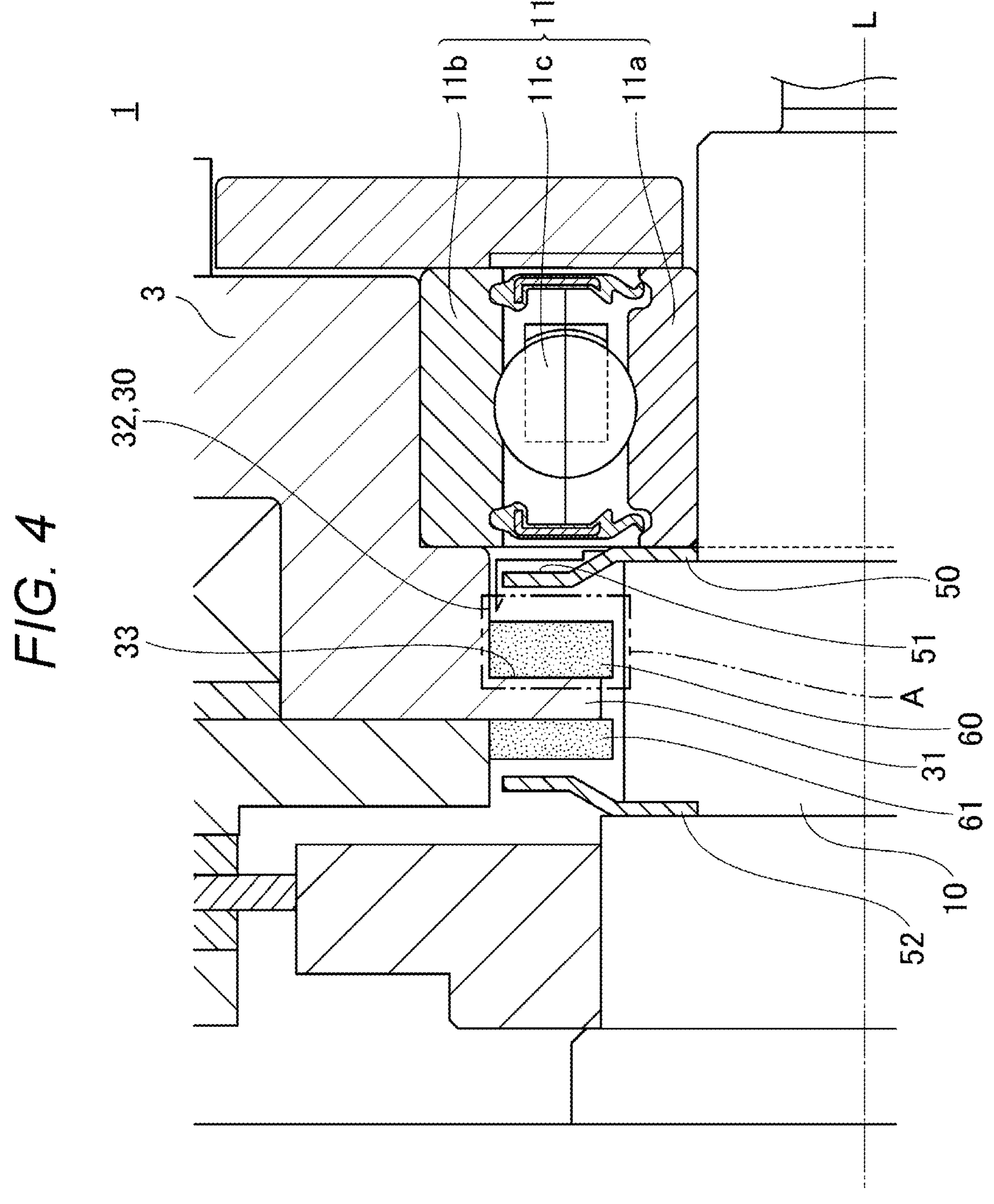
FIG. 4 is an enlarged cross-sectional view of a brake motor according to still another embodiment of the present disclosure.

The brake motor 1 according to the embodiment of the present disclosure has been described until here. In terms of this, the technology of the present disclosure is not limited to the above-mentioned configuration. For example, the brake motor 1 may further include an auxiliary oil adsorbent 61 as illustrated in FIG. 3. In this case, the oil adsorbent 60 is placed, for example, between the auxiliary oil adsorbent 61 and the oil scraper ring 50. Moreover, the brake motor 1 may further include an auxiliary oil scraper ring 52 as illustrated in FIG. 4. By inclusion of the above-mentioned auxiliary oil adsorbent 61 and/or auxiliary oil scraper ring 52, the brake motor 1 can more excellently hinder the oil of the bearing from adhering to the brake disc.

Moreover, although not particularly mentioned in the above-mentioned embodiments, the inner peripheral surface 30 of the yoke 3 may be provided in such a manner as to incline in the direction of the rotation axis L to make it easier for the lubricating oil to flow toward the oil adsorbent 60.

Up to this point the embodiments of the present disclosure have been described. In terms of this, it is needless to say that the technical scope of the present disclosure should not be construed in a limited manner by the description of the embodiments. The embodiments are mere examples. Those skilled in the art understand that the embodiments can be modified in various manners within the technical scope of the present disclosure described in the claims. The technical scope of the present disclosure should be determined on the basis of the technical scope described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A brake motor comprising:
- a brake disc including a friction part;
- a rotating member configured to support the brake disc;
- a bearing;
- a yoke configured to support the rotating member via the bearing in such a manner as to be rotatable about a rotation axis;
- an oil adsorbent; and
- an oil scraper ring provided between the oil adsorbent and the bearing in a direction of the rotation axis, wherein
- the bearing includes an inner ring and an outer ring,
- the oil scraper ring extends from an inner ring side in such a manner as to cover a gap between the inner ring and the outer ring,
- the yoke includes an inner peripheral surface provided with an oil guide surface facing the oil scraper ring, and
- the oil adsorbent is provided in an oil chamber space formed by the oil guide surface, the oil scraper ring, and the rotating member.

2. The brake motor according to claim 1, wherein the oil adsorbent is placed at a position away from the rotating member.

3. The brake motor according to claim 2, wherein the oil adsorbent includes felt or sponge.

4. The brake motor according to claim 2, wherein
- the yoke includes a support portion extending radially inward from the oil guide surface, and
- the oil adsorbent is fixed to the support portion.

5. The brake motor according to claim 2, further comprising an auxiliary oil adsorbent, wherein the oil adsorbent is placed between the auxiliary oil adsorbent and the oil scraper ring.

6. The brake motor according to claim 1, wherein the oil adsorbent includes felt or sponge.

7. The brake motor according to claim 1, wherein
- the yoke includes a support portion extending radially inward from the oil guide surface, and
- the oil adsorbent is fixed to the support portion.

8. The brake motor according to claim 1, further comprising an auxiliary oil adsorbent, wherein the oil adsorbent is placed between the auxiliary oil adsorbent and the oil scraper ring.

* * * * *